UNITED STATES PATENT OFFICE.

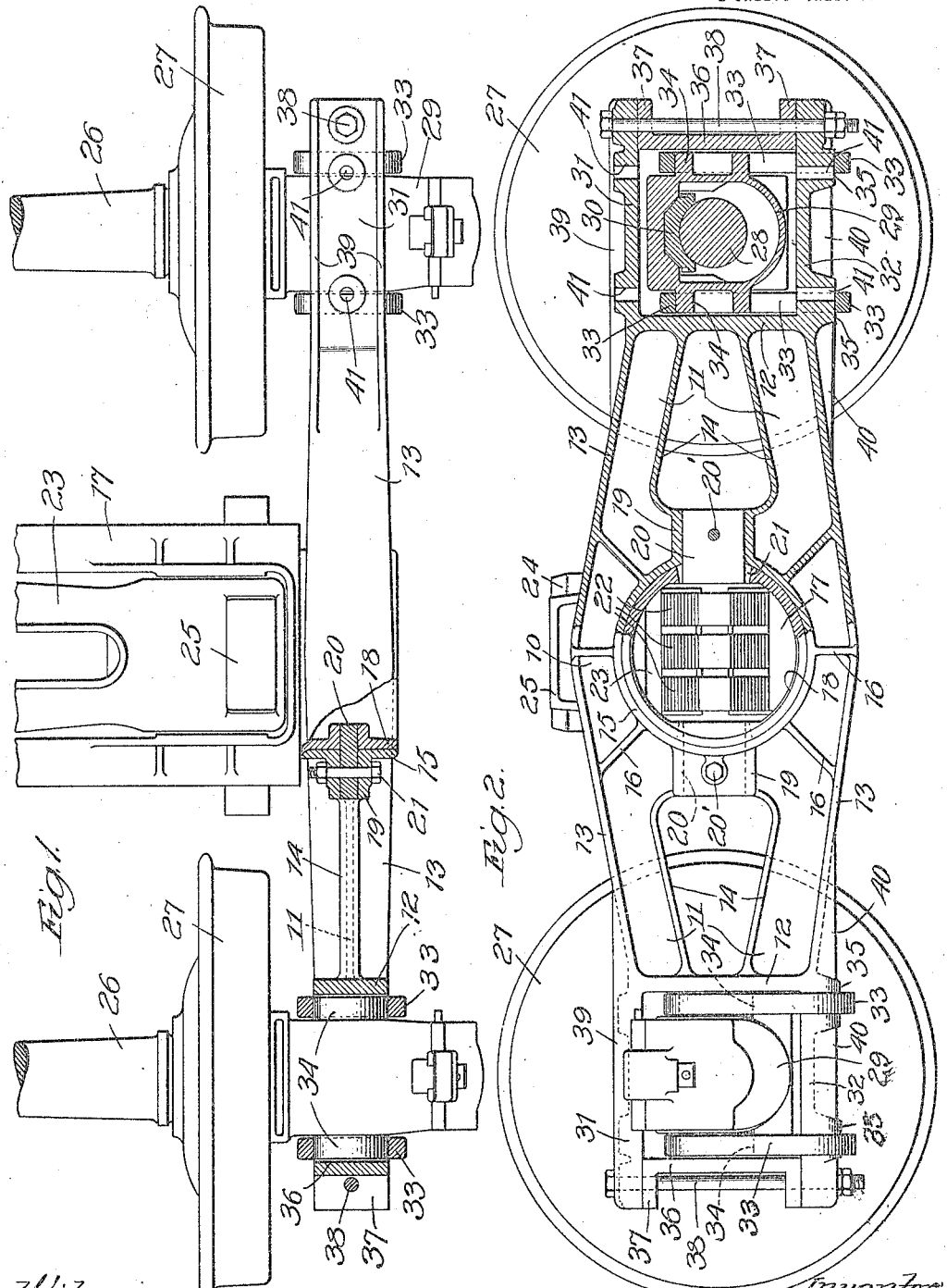

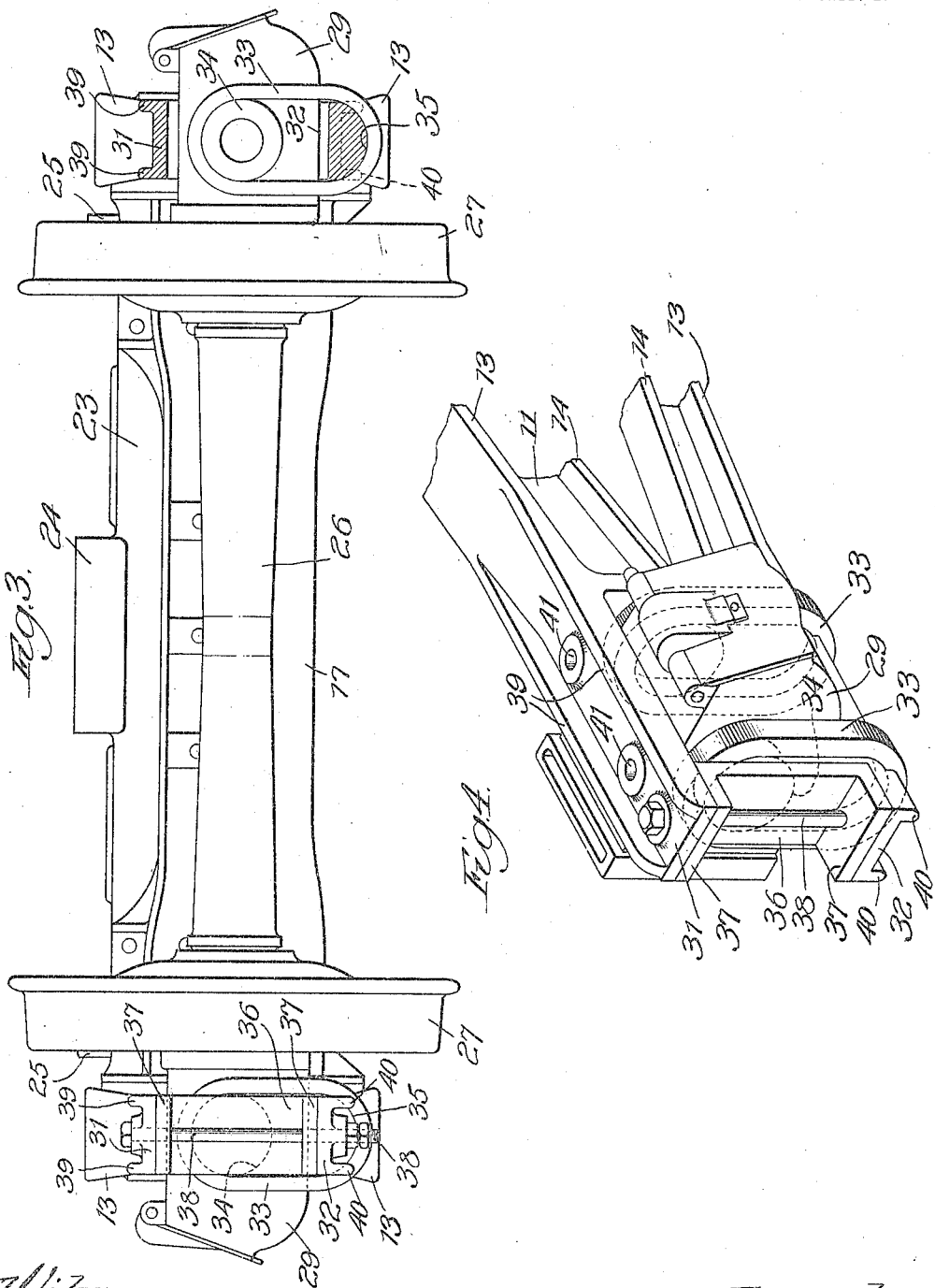

HERBERT H. HEWITT, OF BUFFALO, NEW YORK.

CAR-TRUCK.

1,264,184.

Specification of Letters Patent.   Patented Apr. 30, 1918.

Application filed November 25, 1913.   Serial No. 802,870.

*To all whom it may concern:*

Be it known that I, HERBERT H. HEWITT, a citizen of the United States, and a resident of Buffalo, county of Erie and State of New York, have invented certain new and useful Improvements in Car-Trucks, of which the following is a full, clear, and exact description.

The present invention relates to car trucks and seeks to provide means for mounting the journal box in a manner permitting the independent axial movement of the wheel axles relatively to the truck to thereby relieve the truck and car body from shocks and strains when passing around curves or other irregularities of the track.

More particularly, the invention relates to car trucks in which the construction permits the rocking movement of the truck side frames and wheel axles, so that all of the wheels of the truck may rest solidly on the track in spite of irregularities thereof and without straining or distorting the parts of the truck, and the invention seeks to provide simple and effective means for mounting the journal boxes which will permit both rocking and axial movements of the wheel axles in transverse vertical planes. A further object of the invention is to provide this desired flexibility and at the same time provide a strong, simple construction in which the parts may be readily assembled or taken apart for repairs and the like.

The invention consists in the features of construction hereinafter set forth, illustrated in the preferred form in the accompanying drawings and more particularly pointed out in the appended claims.

In the drawings, Figure 1 is a plan view of a half portion of the truck with parts of one of the side frames shown in horizontal section. Fig. 2 is a view partly in elevation and partly in vertical section through one end of one of the side frames and through one of the journal boxes. Fig. 3 is an end view of the improved truck with one end of one of the side frames shown in vertical section. Fig. 4, is an isometric view of one end of the side frames with the journal box mounted thereon.

The general construction of the truck is preferably similar to that set forth in prior Letters Patent of the United States issued to me September 9, 1913, Nos. 1,072,722 and 1,072,725. As set forth in these patents, each side frame is preferably diamond shape in outline and comprises an enlarged central portion 10 and opposite pairs of inclined, converging side arms 11 which extend from the upper and lower parts of the central portion and which are connected at their outer ends by the vertical, transverse flanges 12. The parts of the side frame are preferably formed of a single casting comprising a vertical central web having wide, outer, marginal flanges 13 and narrow, inner, marginal flanges 14. The central portion of the side frame is provided with a transverse circular opening having a cylindrical edge flange which, like the flanges 13 and 14, project in opposite directions from the central web of the side frame and which forms an enlarged, transverse, cylindrical bearing 15. This cylindrical bearing is slightly wider than the edge flanges 14 and is connected thereto by diagonal bracing flanges 16.

The transverse connecting means between the side frames in the form shown, comprises a truck transom 17 which is provided at its ends with cylindrical journals or trunnions 18 which fit within the bearings 15 of the side frame. The side frame is provided with enlarged bosses 19 on opposite sides of the bearing 15, and which are provided with pockets for receiving keys 20, the inner ends of which extend within slots 21 in the sides of the hollow trunnions or journals 18. The keys are removably held in position by bolts 20' and are arranged to removably secure the side frame upon the end journals of the truck in transverse connecting means of the truck in a manner permitting the limited, independent rocking movement of each of the truck side frames in a longitudinal, vertical plane.
In the particular form shown, the truck transom is provided with a chambered body within which is arranged supporting springs 22 and a truck bolster 23. The latter is provided with the usual center and side bearings 24 and 25.

The wheel axles 26 are provided with wheels 27 and projecting end journals 28 arranged within journal boxes 29. The general form of the journal boxes is preferably similar to the standard prescribed by the Master Car Builders' Association. Each the journal box is preferably formed of an integral body of metal and is provided with a bearing or brass 30 for engaging the journal 28 of the car axle, Each box is arranged within an opening in the end of the side frame, and which opening is preferably formed by upper and lower integral extensions 31 and 32 which project laterally on the end flange 12 of the side frame above and below the journal box. Suitable transverse swinging supports are interposed between the side frames and journal boxes to permit the transverse or axial movement of the journal boxes and the wheel axles relatively to the side frames. These supports preferably comprise a pair of swinging hanger links 33 for each box, these links being pivotally and detachably connected at their upper ends to the sides of the box and pivotally and detachably connected at the lower ends to the lower end extensions 28 of the side frame. In the preferred form shown, the side walls of the journal boxes are provided with integral trunnions 34 and the upper ends of the hanger links 33 are semi-circular in form and extend over these trunnions. The hanger links are also preferably provided with lower semi-circular ends which extend around the lower end extensions 32 of the side frames and engage semi-circular seats 35 formed thereon. Uprights 36 are removably held in place between the ends of the extensions 31 and 32 to thereby removably hold the journal boxes and the supporting hangers in position. These uprights are provided with outwardly projecting end flanges 37 which engage the inner faces of the extensions of the side frames and a bolt 38 passing through the flanges and the ends of the extensions hold the upright in position. By removing the bolt and upright, the hanger links and the journal box may be removed by a movement lengthwise of the side frame for repairs, renewals or the like.

The end extensions 31 and 32 of the side frame are preferably somewhat thicker than the marginal flanges 13 thereof. To further increase the strength of the extensions, they are substantially channel-shaped and provided with vertical flanges 39 and 40 at their side edges. The rounded or semi-cylindrical seats 35 on the lower extensions 32 are formed upon thickened bosses or bodies of metal on the under side thereof and between the flanges 40.

The construction provided for mounting the journal box is strong, but the journal boxes and wheel axles can move axially independently of the side frames, so that lateral shocks and thrusts imparted to the wheels in rounding curves, passing over switches and the like are not imparted to the truck or to the car body carried thereby. It should be noted that the swinging hangers are so arranged that if one of the wheel axles shifts axially relatively to the side frames, the latter are lifted slightly, so that the weight of the truck and of the car body thereon tends to restore and hold the hangers in normal vertical position and thus tends to center the journal boxes relatively to the side frames.

The construction is also such that the journal boxes can oscillate or rock in transverse vertical planes and, inasmuch as the side frames are free to rock independently on the ends of the transverse connecting member of the truck, the wheels will, at all times, rest solidly on the track and are free to rise and fall in passing over irregularities of the rails without transmitting the shocks and strains due to such irregularities to the transverse connecting member of the truck or to the car body carried thereby. The improved construction will, therefore, decrease the wear and the strain upon the parts of the truck and car body and will reduce the wear of the brasses and of the wheel flanges and rails.

The parts for flexibly connecting the side frame and journal box may be readily assembled. The inner hanger link is first placed in position by passing its lower end over the lower end extension 32. The journal box is then inserted and its inner trunnion placed within the upper end of the inner hanger link. The outer hanger link is then placed in position with its upper end extending around the outer trunnion of the box and its lower end around the lower extension. The parts are then held in position by means of the upright 36 and the bolt 38. By removing the bolt and upright, the hangers and box may be readily removed in horizontal direction lengthwise of the side frame and without elevating the truck. The extensions 31 and 32 are preferably provided with alined openings 41 for receiving bolts by means of which an ordinary Master Car Builders' journal box may be rigidly secured in position if desired or necessary in case of accident.

While the improved manner of mounting the journal boxes is advantageous in a truck in which the side frames are swiveled for independent rocking movement, it is obvious that this construction can be employed to advantage in car trucks of other types. Numerous changes may be made in the details set forth without departure from the essentials of the invention as defined in the claims.

I claim as my invention:—

1. A car truck comprising opposite side frames, car supporting means flexibly connecting the central portions of said side frames, wheels and wheel axles having projecting end journals, boxes for receiving said journals, and pairs of vertically disposed, swinging hangers pivotally connected at their lower ends to said side frames and pivotally connected at their upper ends to the opposite sides of said journal boxes at points substantially in line with the axes of said wheel axles, said hangers being arranged to swing in vertical planes parallel to said wheel axles and permit the axial and transverse rocking movement of said axles relative to said side frames.

2. A bogie car truck comprising opposite side frames, a transverse member extending between and flexibly connecting the central portions of said side frames, a spring supported truck transom mounted on said transverse member, wheels and wheel axles having projecting end journals, boxes for receiving said journals, and pairs of vertically disposed, swinging hangers pivotally connected at their lower ends directly to said side frames and pivotally connected at their upper ends to the opposite side walls of said journal boxes at points below the tops of said journal boxes, said hangers being arranged to swing in vertical planes parallel to said wheel axles to permit the independent axial and transverse rocking movement of said axles relative to said side frames.

3. A car truck comprising connected side frames having openings at their ends, wheels and wheel axles, journal boxes for said wheel axles arranged within the openings of said side frames and having laterally projecting integral trunnions on the side walls thereof and pairs of swinging hangers pivotally and removably engaging said trunnions and the lower walls of said openings, said hangers being arranged between and held in place by the sides of said journal boxes and the side walls of said openings.

4. In a car truck, the combination with a wheel axle, a journal box therefor and a truck member, of a pair of swinging hangers for supporting said truck member from said journal box, said hangers being pivotally connected at their lower ends to said truck member and pivotally connected at their upper ends to the opposite sides of said box at points substantially in horizontal alinement with the axis of said wheel axle, and the axes of said pivotal connections being at right angles to the axis of said wheel axle.

5. In a car truck, the combination with a truck member, of a journal box having laterally projecting trunnions at its sides in line with the axis thereof, and a pair of swinging hangers pivotally engaging and depending from said trunnions and having their lower ends pivotally connected to and supporting said truck member.

6. In a car truck, a side frame having an opening therein, a journal box arranged within said opening, a pair of transversely swinging hangers removably and pivotally connected to the side walls of said box and the lower wall of said opening, one of the side walls of said opening being detachably secured in position to permit the longitudinal removal of said box.

7. In a car truck, a side frame having upper and lower end extensions, a journal box arranged between said extensions, hangers removably and pivotally connected to the side walls of said box and said lower extension, and an upright detachably connected to the ends of said extensions for holding said box and hangers in position.

8. In a car truck, a truck member, a journal box having laterally projecting side trunnions, and a pair of hanger links having rounded end portions extending over said trunnions and said member, the latter having rounded seats for the lower ends of said links.

9. In a car truck, a side frame having upper and lower end extensions, a journal box having side trunnions arranged between said extensions, hanger links extending about said trunnions and said lower end extension, and an upright member detachably secured between the ends of said extensions for holding said box and hanger links in position, substantially as described.

10. In a car truck, connected side frames, wheels and wheel axles, journal boxes for said wheel axles, and means for mounting said journal boxes on said side frames in a manner permitting the independent axial and transverse rocking movements of said axles and said boxes and the removal of said boxes in a direction longitudinally of said side frames.

11. In a car truck, parallel side frames, a transverse member connected to said side frames in a manner permitting the rocking movement of the latter in vertical planes, wheels and wheel axles, and journal boxes for said wheel axles mounted on said side frames in a manner permitting the independent axial movement of said wheel axles.

12. In a car truck, parallel side frames, a transverse member connected to said side frames in a manner permitting the independent rocking movement of said side frames in vertical planes, wheels and wheel axles, and journal boxes for said wheel axles mounted on the ends of said side frames in a manner permitting independent axial and transverse rocking movement of said boxes and wheel axles in transverse planes at right angles to said side frames.

13. In a car truck, a transverse connecting member, car supporting means thereon, side frames centrally pivoted upon the ends of said transverse member, journal boxes, and transversely swinging hangers interposed between and pivotally connected to said journal boxes and the ends of said side frames.

14. In a car truck, a transverse connecting member having car supporting means thereon and end journals, side frames centrally and removably mounted on said end journals, journal boxes, and pairs of transversely swinging hangers pivotally and removably connected to the ends of said side frames and to the sides of said journal boxes.

15. In a car truck, connected side frames having end extensions, journal boxes above said extensions, and supports connected at their upper ends to the sides of said boxes and at their lower ends to said extensions.

16. In a car truck, a side frame having upper and lower end extensions, a journal box arranged between said extensions, pairs of supports removably engaging the sides of said journal boxes and said lower extensions, and uprights detachably secured to the ends of said extension for holding said boxes and supports in position.

17. A car truck comprising opposite side frames, a transverse member extending between and flexibly connecting the central portions of said side frames, wheels and wheel axles having projecting end journals, boxes for receiving said journals and pairs of vertically disposed swinging hangers pivotally connected at their lower ends to the ends of said side frames and pivotally connected at their upper ends to the sides of said journal boxes, said hangers being arranged to swing in vertical planes parallel to said wheel axles to permit the independent axial and transverse rocking movement of said axles relative to said side frames.

HERBERT H. HEWITT.

Witnesses:
J. G. ANDERSON,
ELEANOR HAGENON.